(12) United States Patent
Meyer et al.

(10) Patent No.: US 9,539,537 B1
(45) Date of Patent: Jan. 10, 2017

(54) RADON REMOVAL APPARATUS

(71) Applicants: Colin G. Meyer, Madison, IN (US); Allan H. Moyse, College Station, TX (US)

(72) Inventors: Colin G. Meyer, Madison, IN (US); Allan H. Moyse, College Station, TX (US)

(73) Assignee: Radon Scrubber LLC, Troy, MI (US)

( * ) Notice: Subject to any disclaimer, the term of this patent is extended or adjusted under 35 U.S.C. 154(b) by 0 days.

(21) Appl. No.: 14/928,380

(22) Filed: Oct. 30, 2015

Related U.S. Application Data

(63) Continuation-in-part of application No. 14/519,645, filed on Oct. 21, 2014, now Pat. No. 9,230,700.

(60) Provisional application No. 61/894,162, filed on Oct. 22, 2013.

(51) Int. Cl.
| | | |
|---|---|---|
| *B01D 53/00* | (2006.01) | |
| *B01D 53/18* | (2006.01) | |
| *B01F 3/04* | (2006.01) | |
| *G21F 9/02* | (2006.01) | |

(52) U.S. Cl.
CPC .......... *B01D 53/18* (2013.01); *B01F 3/04106* (2013.01); *G21F 9/02* (2013.01)

(58) Field of Classification Search
CPC .......... G21F 1/00–9/26; B01D 53/00–53/965; B01D 2252/205; B01D 2259/4508
USPC ....... 95/149–240; 96/243–371; 454/168–172
See application file for complete search history.

(56) References Cited

U.S. PATENT DOCUMENTS

| | | | | |
|---|---|---|---|---|
| 3,853,501 A | * | 12/1974 | Stringer | B01D 47/00 210/282 |
| 4,957,394 A | * | 9/1990 | Jarnagin | B09C 1/005 405/128.2 |
| 5,131,931 A | | 7/1992 | Miley et al. | |
| 5,743,944 A | * | 4/1998 | Gross | B01D 53/14 95/180 |
| 6,391,093 B1 | * | 5/2002 | French | B23K 26/1435 95/214 |
| 6,676,780 B1 | | 1/2004 | Shahar | |
| 2008/0311840 A1 | | 12/2008 | Rainey et al. | |
| 2011/0265648 A1 | * | 11/2011 | Meirav | B01D 53/02 95/227 |

* cited by examiner

*Primary Examiner* — T. Bennett McKenzie
(74) *Attorney, Agent, or Firm* — Philip L. Bateman

(57) ABSTRACT

Radon is removed from a gas in an apparatus having: (a) a liquid-gas contacting apparatus containing a fresh working liquid in which radon is soluble; (b) a shielded reservoir containing the working liquid; and (c) a means for causing a stream of gas containing radon to pass through the liquid-gas contacting apparatus. When the radon level in the working liquid reaches a certain level, the working liquid is either taken out of service and stored until the radon level is reduced or the working liquid is diluted with additional working liquid having no radon.

4 Claims, 3 Drawing Sheets

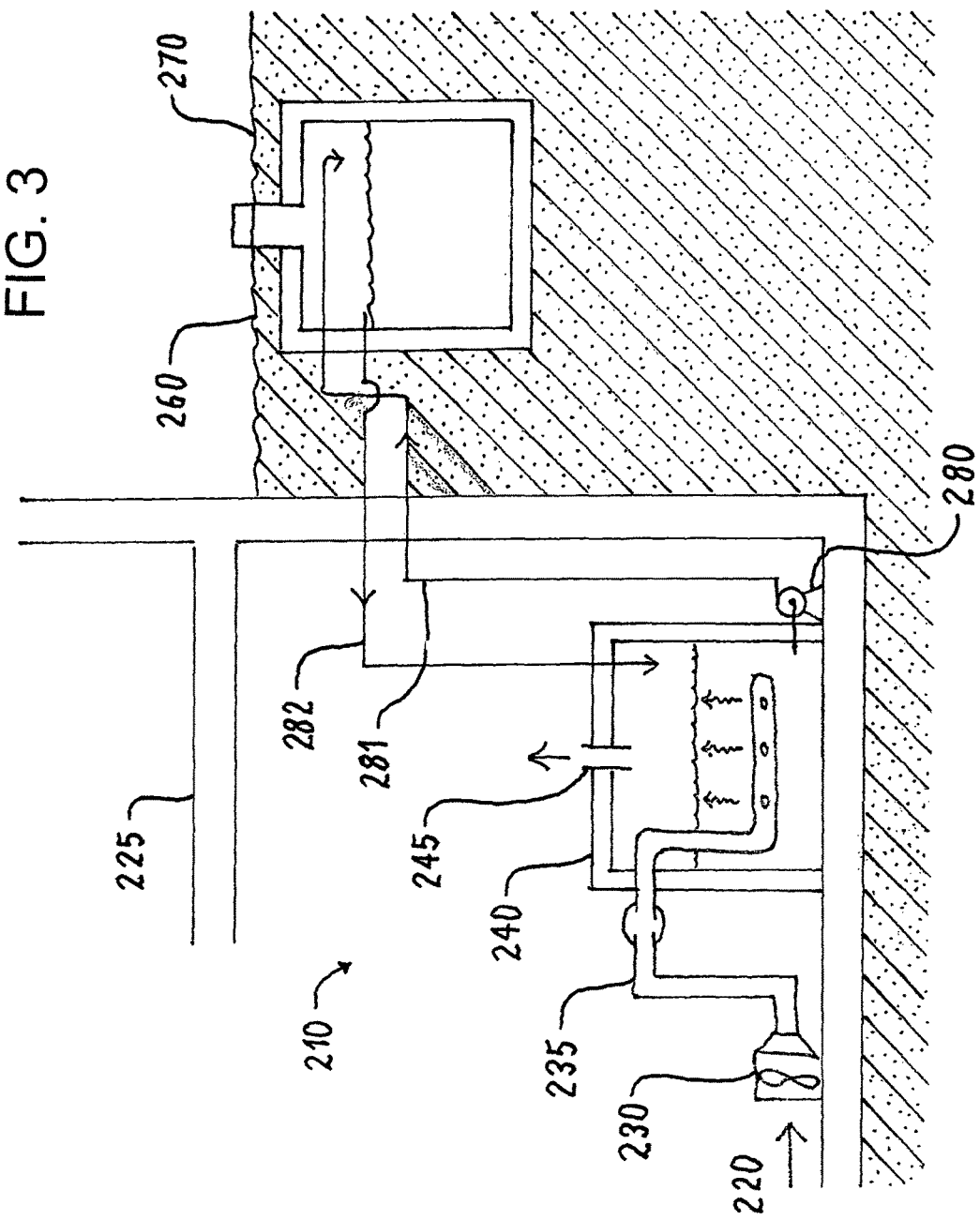

RADON REMOVAL APPARATUS

CROSS-REFERENCE TO RELATED APPLICATIONS

This application is a continuation in part of U.S. Utility patent application Ser. No. 14/519,645, Oct. 21, 2014, now pending, that claimed the benefit of U.S. Provisional Application Ser. No. 61/894,162, Oct. 22, 2013.

FIELD OF THE INVENTION

This invention relates to gas separation. More particularly, this invention relates to an apparatus for the removal of radon from a gas.

BACKGROUND OF THE INVENTION

Radon is a gaseous element having the atomic number 86, i.e., an atom of radon has 86 protons in its nucleus and 86 electrons. Radon is a member of a group of elements known as the noble gases because they are relatively unreactive. Radon exists in the form of eighteen different isotopes. Isotopes are atoms of an element that contain different numbers of neutrons in their nuclei. Particular isotopes are commonly identified by their total number of protons and neutrons. For example, radon-222 is an isotope containing 86 protons and 136 neutrons.

All isotopes of radon are radioactive. Radioactivity is a process in which atoms undergo spontaneous nuclear transformations or decay by emitting atomic particles and/or electromagnetic energy. The most common types of radioactive decay are alpha decay (which produces an alpha particle consisting of two protons and two neutrons) and beta decay (which produces an electron). Electromagnetic radiation in the form of a gamma ray is also emitted as part of each alpha and beta decay. Each gamma ray is emitted in a random direction and travels in a straight line until absorbed.

The rate of radioactivity is measured by its half-life. A half-life is the time for one-half of the atoms to undergo radioactive transformation. Seventeen of the eighteen radon isotopes have half-lives of a minute or less. Radon-222 is the most stable of the radon isotopes and has a half-life of 3.8 days. Radon-222 decays through several intermediates (also known as decay progeny) into lead-210, an isotope of lead (atomic number 82) having a half life of 22 years. Lead-210 decays through intermediates into the stable, nonradioactive lead-206.

Radon is constantly being formed by the radioactive decay of subterranean uranium (atomic number 92). Uranium is present primarily in the form of the uranium-238 isotope. Uranium-238 is radioactive with a half life of 4.5 billion years. Uranium-238 decays through several intermediates into radon-222. The slow decay of uranium-238 has been occurring since the earth was formed. The decay chain from uranium-238 via radon-222 to lead-206 produces multiple alpha, beta, and gamma emissions. The highest energy gamma ray emission in this decay chain is about 7.7 MeV (mega electron volts).

Radon is also being formed by the radioactive decay of subterranean thorium (atomic number 90). Thorium is present primarily in the form of the thorium-232 isotope. Thorium-232 is radioactive with a half life of 14 billion years. Thorium-232 decays through several intermediates into radon-220. Radon-220 has a half-life of about one minute. Radon-220 decays through several intermediates into stable, nonradioactive lead-208. The decay chain from thorium-232 via radon-220 to lead-208 also produces multiple alpha, beta, and gamma emissions. For brevity, the term "radon" is used hereinafter to refer to all the isotopes of radon.

As a result of the ongoing formation of radon from radioactive decay, radon gas is constantly seeping upward through rock and soil toward the surface of the earth. The radon poses no risk if it decays before reaching the surface because its decay progeny are solids that remain wherever formed. Similarly, the radon poses no risk if it reaches the atmosphere because its concentration is so small. However, radon can enter buildings and concentrate to dangerous levels in the air, particularly in basements and first floors of buildings without basements. Radon levels vary considerably at different sites, and over time at any given site. Many factors cause these variations. For example, low pressure atmospheric conditions which often occur during storms are believed to draw higher levels of radon from the ground.

Radon is the leading environmental cause of cancer in the United States and the second-leading cause of lung cancer. The harmful effects are due primarily to alpha, beta, and gamma ray emissions inside the body resulting from radon breathed into the lungs. The health risks posed by radon have become more widely recognized in the past decade. The United States Environmental Protection Agency has recommended that homeowners take corrective action if the level of radon in their homes exceeds 4 picocuries per liter (about 0.04 decays per second per liter of air). There are two basic ways to lower radon levels in a building. The first is to suppress the flow of radon into a the building. The second is to remove the radon that is already there.

One common technique for suppressing the flow of radon into a building is to seal cracks and other openings in the building foundation, often in conjunction with sub-slab decompression. However, it is difficult to identify and permanently seal every opening. Furthermore, normal settling of buildings creates new openings and reopens old ones. The flow of radon into buildings is also suppressed by placing a barrier film on or under the lowest floor. An example of such a method is disclosed in Shahar, U.S. Pat. No. 6,676,780, Jan. 13, 2004.

The most common technique for removing existing radon from the air in a building is to increase ventilation. Simply opening doors and windows can lower radon levels. However, ventilation is difficult in basements with few, if any, windows or doors. Ventilation also results in the loss of conditioned air, discomfort, security problems, and increased costs of conditioning outside air.

Another technique for removing existing radon from the air in a building is to operate a liquid-gas contacting apparatus, commonly known as a wet scrubber. A wet scrubber is an apparatus in a which a gas stream is brought into contact with a working (scrubbing) liquid by forcing the gas through the liquid, by spraying the gas with the liquid, or by some other contact method. As the gas and liquid make contact, one or more components of the gas are absorbed, captured by the clathrate mechanism, or otherwise transferred from the gas to the liquid. The terms "absorb" and "dissolve" are used herein to refer to any mechanism by which a component of a gas becomes a component of a liquid. The removal of radon from air with a wet scrubber having an oil as the working liquid is disclosed in Gross et al., U.S. Pat. No. 5,743,944, Apr. 28, 1998. Gross et al. disclose that suitable oils include vegetable oils, animal oils, and petroleum oils.

While a wet scrubber removes radon from the air, the radon absorbed into the liquid remains a health risk. If the level of radon or its decay progeny reach a level to generate 2000 picocuries per gram (pCi/g), the liquid becomes a "low-level radioactive waste" as defined by the U.S. Environmental Protection Agency and requires special handling. Gross et al. address this problem by removing the working liquid from the wet scrubber, agitating and heating the liquid to release the radon from the liquid, and then venting the released radon to the atmosphere. The immediate removal of radon from the working liquid is an expensive step that adds greatly to the complexity and cost of the wet scrubber system.

Accordingly, a demand exists for an improved wet scrubber apparatus for removing radon from a gas, such as the air in the interior of a building, that does not require the immediate removal of radon from the working fluid.

SUMMARY OF THE INVENTION

The general object of this invention is to provide an improved apparatus for removing radon from a gas, such as the air in the interior of a building. A more particular object is to provide a wet scrubber apparatus for removing radon from a gas that do not require the radon to be removed from the working liquid.

We have invented an improved radon removal apparatus. The apparatus comprises: (a) a liquid-gas contacting enclosure containing a working liquid in which radon is soluble; (b) a shielded reservoir containing the working liquid; and (c) a means for causing a stream of gas containing radon to pass through the liquid-gas contacting enclosure.

The apparatus of this invention provide an effective, simple, and cost effective means for removing radon from a gas. The radon is captured in a working liquid. When the radon level in the working liquid reaches a certain level, the working liquid is either taken out of service and stored until the radon level is reduced or the working liquid is diluted with additional working liquid having no radon. In either case, there is no need to remove the captured radon from the working liquid.

BRIEF DESCRIPTION OF THE DRAWING

FIG. 3 is a diagram showing a third embodiment of the apparatus of this invention.

DETAILED DESCRIPTION OF THE INVENTION

1. The First Embodiment

Figure 1:
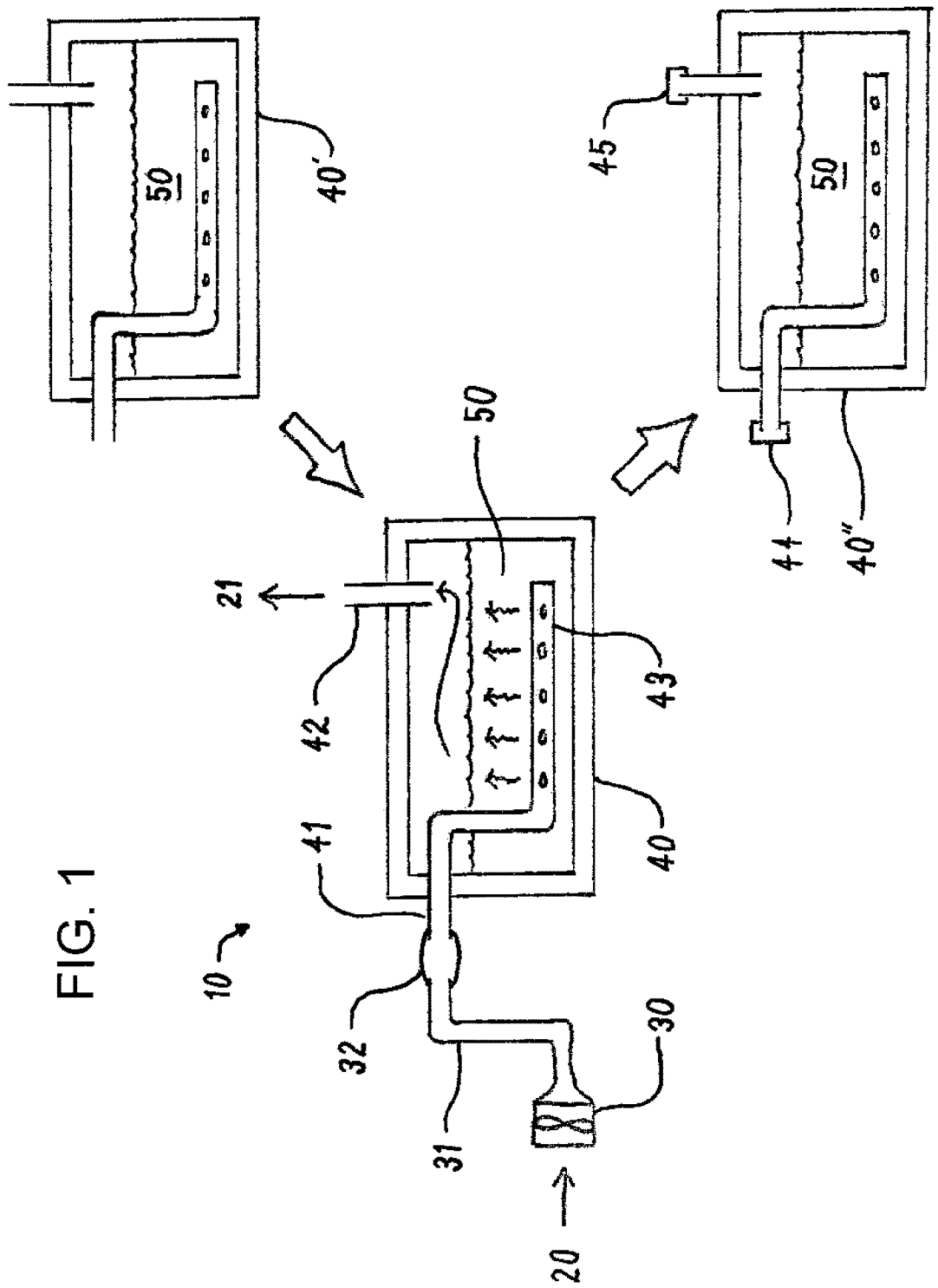
FIG. 1 is a diagram showing a first embodiment of the apparatus of this invention.

This invention is best understood by reference to the drawings. Referring to FIG. 1, a gas stream 20 containing radon is treated in a first embodiment of the apparatus 10 of this invention. The first embodiment is especially suited for removing radon from the ambient air in a residential building. The apparatus comprises a blower 30 and an integral liquid-gas contacting enclosure/shielded reservoir 40 containing a liquid 50 in which the radon is soluble. In the first embodiment, the liquid-contacting enclosure and the shielded reservoir are an integral unit. If desired, the liquid-contacting enclosure and the shielded reservoir are separate components. The treated gas 21, which is depleted in radon, is vented back into the building. The components of the apparatus are discussed in detail below.

Also shown in FIG. 1 are two other liquid-gas contacting enclosures/shielded reservoirs—a replacement unit 40' and a spent unit 40". The replacement unit is ready for future use. The spent unit has been placed in storage until substantially all the absorbed radon decays to lead. As explained in detail below, the current unit will be taken out of service after a period of time and placed into storage along with the spent unit. The replacement unit will simultaneously be placed into service.

2. The Gas Stream

The gas stream 20 contains radon and is at a temperature and pressure that does not adversely affect the working liquid. A preferred gas stream is ambient air in a building interior that contains radon. Ambient air typically contains about 78 percent nitrogen, about 20 percent oxygen, about one percent water vapor, and about one percent other gases. Other suitable gas streams include natural gas (comprising primarily methane) and various industrial gas streams.

3. The Blower

The blower 30 causes the radon-containing gas to enter the liquid-gas contacting enclosure. The blower has a rotating impeller that propels the gas in a direction that is perpendicular to the axis of rotation. The size and air flow capability of the blower is a matter of choice that depends on the desired capability of the apparatus. In the preferred embodiment, the blower is a small, electrically-powered unit having sufficient capacity to cause the gas to pass through the liquid-gas contacting enclosure. Other means for causing the gas stream to flow through the liquid-gas contacting enclosure are also suitable, including displacement pumps, fans (that propel the gas in a direction parallel to the axis of rotation of the vanes), and the like.

After passing through the blower, the radon-containing gas enters a duct 31. The outlet of the duct contains a sleeve 32 or other suitable means for connection to the inlet of the liquid-gas contacting enclosure. The means for connection is preferably simple enough that a homeowner can make the connection (and disconnection) quickly by hand or with commonly available tools.

4. The Liquid-Gas Contacting Enclosure

The liquid-gas contacting enclosure 40 is the component of the apparatus where a gas stream is brought into contact with a working (scrubbing) liquid by causing the gas to flow through the liquid (either with or without packing such as Raschig rings, structured packing, and the like) through a vertical column or tank, by spraying the gas with the liquid, or by some other contact method. A wide variety of such wet scrubbers are known in the art.

One of the simplest types of enclosures is used in the preferred embodiment. This enclosure is a sealed tank partially filled with a working liquid 50 and having an inlet 41 for the radon-containing gas and an outlet 42 for the radon-depleted gas. The inlet is preferably above the level of the liquid so that liquid cannot flow out the inlet. The inlet preferably contains a replaceable filter to remove large particulates. Filters similar to those used in forced air heating units are suitable. The outlet preferably contains a coalescing metal mesh filter to entrap any entrained working liquid in the exiting gas stream.

The inlet feeds into a perforated pipe or plate 43 near the bottom of the enclosure. The radon-containing gas passes through the perforations and upward through the working liquid (as represented by the wavy lines in FIG. 1). Screens, filters, or the like are preferably placed over the perforations to reduce the size of the gas bubbles and thereby increase the surface area of contact between the gas and the liquid. The radon-depleted gas then passes through the head space above the liquid and exits the enclosure.

The enclosure of the preferred embodiment has no moving parts. Because the enclosure and reservoir are integral, there is no need to pump the liquid back and forth between the enclosure and the reservoir. Furthermore, the integral enclosure/reservoir can be removed and replaced by simply undoing the connection to the blower duct.

5. The Working Liquid

The working liquid 50 captures some of the radon as it makes contact with the radon-containing gas. The working liquid also captures particulates and other solids in the gas, including radon decay progeny. Suitable working liquids are those in which radon is soluble. Preferred working liquids include hydrocarbon oils of vegetable, animal, petroleum, or synthetic origin (e.g., silicone oil) as known in the art, including those described in Gross et al., U.S. Pat. No. 5,743,944, Apr. 28, 1998. The selection of the oil depends on radon solubility, cost, stability of the liquid, and other factors. The level of radon and its decay progeny in the working liquid is never allowed to reach the point at which the working liquid becomes a low-level radioactive waste.

6. The Shielded Reservoir

The shielded reservoir contains all or a substantial portion of the working liquid. As previously discussed, the shielded reservoir of the preferred embodiment is integral with the liquid-gas contacting enclosure. In other embodiments, the shielded reservoir takes the form of a tank from which the working liquid is pumped to, and returned from, the liquid-gas contacting enclosure.

The size, liquid capacity, and structure of the shielded reservoir are matters of choice that depend on the desired gas flow rate, the anticipated radon level in the gas, the solubility of radon in the working liquid, the desired service life of the working liquid, and other factors. For a typical single family residence, a reservoir in the form of a tank made of a shielding material having a liquid capacity of about one to ten gallons is sufficient for use for at least a year without needing replacement. A reservoir of this capacity typically weighs about ten to one hundred pounds and can be moved and transported relatively easily. A second suitable form of reservoir is made of a lightweight material such as a thermoplastic, and has a hollow wall that is then filled with a suitable shielding material such as sand or water. A third suitable form of reservoir is an enclosure made of a non-shielding material, for example a thermoplastic such as polyvinyl chloride, that is placed inside a shielding enclosure.

A variety of materials are suitable for the shielding component of the enclosure walls. For example, metals, concrete, brick, sand, water, and soil are commonly used to shield radiation. The choice of preferred material depends on weight, cost, and other factors.

The amount of shielding is a matter of choice to a certain extent. If the goal is to prevent a single alpha particle, beta particle, or gamma ray from escaping the reservoir, the thickness of the shielding for a given material can be calculated as follows. The shielding would need to absorb a gamma ray having an energy of about 7.7 MeV because that is the highest energy gamma ray emitted during the decay of radon to nonradioactive lead. Shielding that can absorb a 7.7 MeV gamma ray can also absorb alpha and beta particles. The thickness of a given material needed for containment of a 7.7 MeV gamma ray is easily calculated from published empirical correlations between gamma ray energy and the attenuation coefficient (also known as the linear attenuation coefficient) of the material. The attenuation coefficient is a measure of how easily the material can be penetrated by gamma rays or other energy or matter. For example, the attenuation coefficient for lead for a gamma ray of 7.7 MeV is about $0.5$ $cm^{-1}$. Accordingly, lead having a thickness of about 2 cm (or one inch) is needed for complete containment of a perpendicularly-directed 7.7 MeV gamma ray.

As a practical matter, a reservoir that completely contains a 7.7 MeV gamma ray is unnecessary for several reasons. First of all, simply locating the reservoir in the lowest level of a building, preferably along an outside wall or at an outside corner, ensures that most of the emitted gamma rays will be directed into the soil surrounding the building rather than into the living space. The relocation of interior radon from room air that is breathed by occupants into a shielded oil reservoir greatly reduces the total radiation exposure of the occupants and accordingly reduces the frequency of radon decay events in close proximity to lung tissues, which in turn is believed to be the etiology of radon-caused lung cancer.

Secondly, any amount of shielding between the working liquid and the living space causes some reduction in gamma rays. Thirdly, it makes little sense to use an expensive and heavy enclosure that will completely contain all gamma rays when some radon will always remain in the living space. More particularly, some radon will always remain because radon is constantly entering the living space, because some of the radon-containing air will never be drawn into the liquid-gas contacting apparatus, and because not all the radon that passes through the liquid-gas contacting apparatus is absorbed into the working liquid. In short, any reduction in the radon in the living space is beneficial and the more reduction the better, but a complete elimination of radon is impossible.

7. Operation

The operation of the preferred embodiment of the apparatus can now be considered. The integral liquid-gas contacting enclosure/shielded reservoir is filled to the desired level with the desired working fluid (vegetable oil, petroleum oil, etc.). If the enclosure shell is of the hollow type, the shell is filled with the desired shielding material (water, sand, etc.). The enclosure/reservoir is moved to the lowest level of the building either before or after filling. As discussed above, the enclosure/reservoir is preferably placed along an outside wall or at an outside corner to increase the likelihood that any escaping radiation will be directed into the soil surrounding the building rather than into the living space. If desired, the enclosure/reservoir is placed into a separate enclosure, such as a small space defined by walls of brick, sand bags, concrete block, or the like, or into a recessed pit in the foundation. The blower (or other gas mover) is then connected to a source of electrical power and the blower duct is connected to the inlet of the integral liquid-gas contacting enclosure/shielded reservoir. The blower is then turned on and allowed to run continuously.

After a period of time, the reservoir with the spent working liquid is taken out of service. If desired, the apparatus contains a timer similar to those used with water softeners that either automatically shuts off the apparatus, displays a visual signal, or emits an aural signal to remind the responsible person that the reservoir needs to be replaced. As previously discussed, the reservoir is replaced before the working liquid accumulates enough radioactive materials (radon, lead-210, etc.) to become a low-level radioactive waste.

After being taken out of service, a first cap 44 is placed on its inlet and a second cap 45 is placed on its outlet. If exposure to radiation escaping out the inlet and outlet during capping (or at any time) is a concern, it can be minimized in various ways. One way is to include baffles of a suitable material at the inlet and outlet that reduce the escape of radiation at all times. Another way is to provide a solenoid or other mechanism that automatically moves the caps over the inlet and outlet at the desired time. The capped reservoir is then removed from the building and transported to a storage facility.

As soon as one reservoir is removed from service, a new reservoir with fresh working liquid is brought in and connected. The removed reservoir is stored until substantially all the absorbed radon decays to lead. As previously discussed, the half life of radon is about four days. Accordingly, about 50 percent of the radon decays in four days, about 75 percent decays in 8 days, about 88 percent decays in 12 days, about 94 percent decays in 16 days, and so on.

After substantially all the radon has decayed, the liquid is removed from the reservoir and treated to remove the lead. The lead includes several isotopes, including radioactive lead-210, nonradioactive lead-208, and nonradioactive lead-206. The liquid can then be recycled or discarded. The reservoir is refilled with fresh liquid and is ready for use again.

8. Advantages

The apparatus and method of this invention have many advantages over those of the prior art. One advantage over most radon reduction methods is that there is no need for exterior ventilation. An advantage over most wet scrubber methods is that there is no need to agitate, heat, or otherwise treat the spent working liquid to remove absorbed radon. Instead, the replaceable reservoir containing the spent working liquid is simply taken out of service and placed in storage until the radon decays to lead to the desired degree. An advantage of the preferred embodiment is that it is especially suited for residential use because of its size, low power consumption, and relatively silent operation.

9. The Second Embodiment

Figure 2:
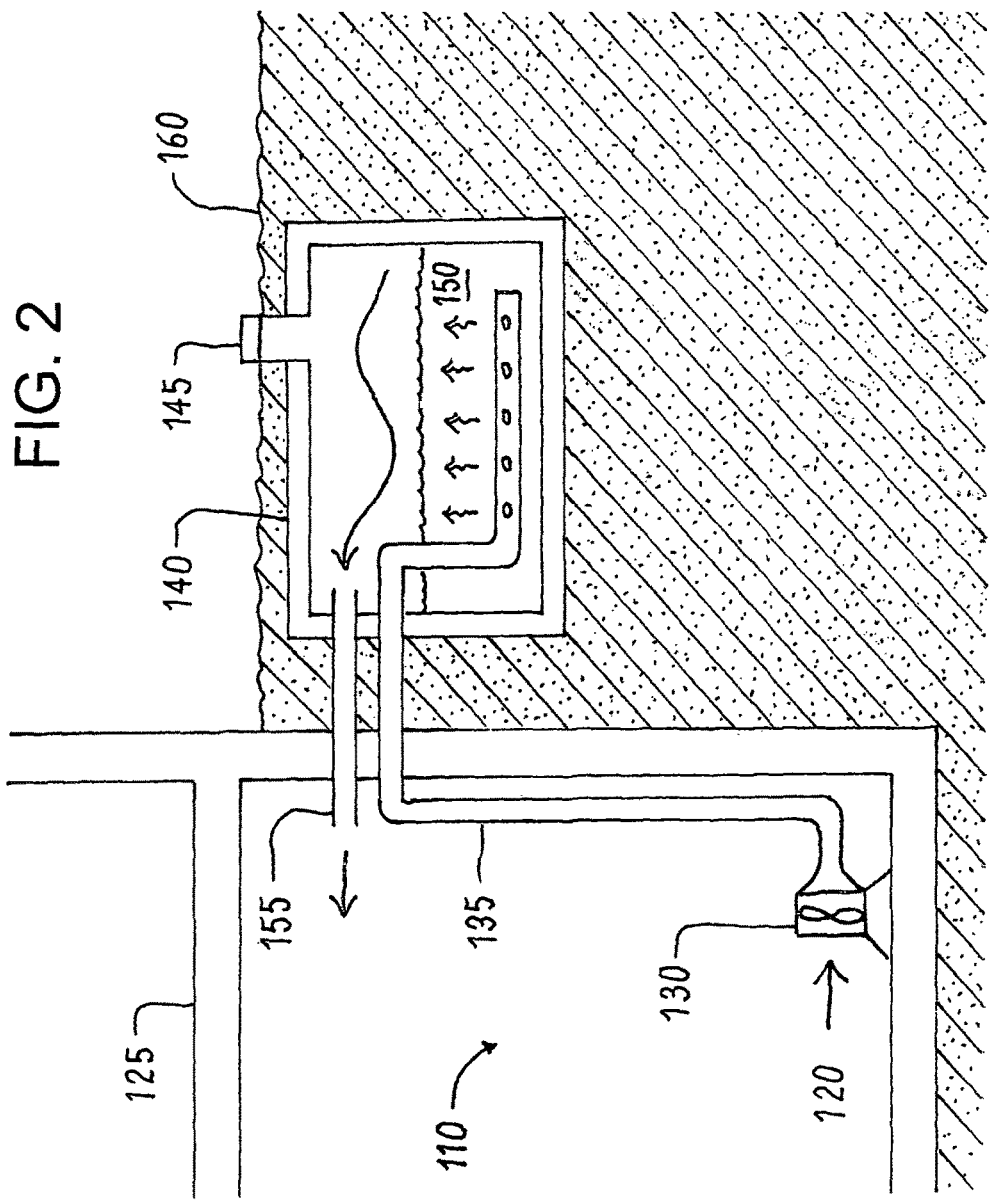
FIG. 2 is a diagram showing a second embodiment of the apparatus of this invention.

Referring now to FIG. 2, the second embodiment 110 of the invention is shown treating the ambient air 120 in the basement of a residential building 125. The apparatus comprises a blower 130, an outflow duct 135, and an integral liquid-gas contacting enclosure/shielded reservoir 140. The enclosure/reservoir has an access door 145 and is partially filled with a liquid 150 in which the radon is soluble. After the air is treated, the radon depleted air returns to the basement through the return duct 155.

The enclosure/reservoir is buried under the ground 160 outside and in relative close proximity to the house with the access door just above ground level. The enclosure/reservoir is generally less than 100 feet from the house and preferably less than 50 feet from the house. An especially convenient location for the enclosure/reservoir is directly below a compressor or heat pump of a cooling system where it is very unlikely that the reservoir will be accidentally damaged by digging, trenching, or the like. The earth around the enclosure/reservoir provides the necessary shielding so the wall material is determined primarily by structural considerations rather than radiation considerations.

The operation of the second embodiment is similar to the first. However, instead of replacing the entire enclosure/reservoir, the access door is opened and the spent working liquid is removed and new working liquid added. The spent working liquid can be treated as desired. It can be stored in a shielded container until the radon decays to the desired level or it can be added to other liquid of the same type. The dilution of the spent working liquid may provide the necessary reduction in radon level. For example, assume the enclosure/reservoir has been in use for many years with a working liquid consisting of five gallons of motor oil. Assume also that the radioactivity level has reached 10,000 picocuries per gram (pCi/g), a level that is well above the 2,000 pCi/g threshold for "low-level radioactive waste" as defined by the U.S. Environmental Protection Agency. Removing the spent motor oil and adding it to thirty gallons of used motor oil results in thirty-five gallons of used motor oil having a radioactivity level of 1,428 pCi/g that is below the threshold for "low level radioactive waste" and that can be safely handled as desired.

10. The Third Embodiment

Referring now to FIG. 3, the third embodiment 210 of the invention is shown treating the ambient air 220 in the basement of a residential building 225. The apparatus comprises a blower 230, an outflow duct 235, a liquid-gas contacting enclosure 240, a return duct 245, and a separate shielded reservoir 270. The sizes of the enclosure and reservoir are not drawn to scale. The reservoir preferably has a significantly greater volume than the enclosure. The liquid-gas contacting enclosure preferably contains a perforated plate or pipe submerged in the working liquid as previously described.

A pump 280 transfers the working liquid from the enclosure to the reservoir via line 281. The working liquid flows by gravity from the reservoir to the enclosure via overflow return line 282. Lines 281 and 282 are relatively small in diameter and are preferably routed through the exterior wall at the same place as the refrigerant lines for the cooling system.

The shielded reservoir is buried under the ground 260 outside with the same considerations discussed above with respect to the enclosure/reservoir of the second embodiment. The treatment of spent working fluid is also similar to the treatment in the second embodiment.

The use of a separate shielded reservoir allows some advantageous changes to the liquid-gas contacting enclosure. For example, when compared to the integral enclosure/reservoir in the first and second embodiments, the enclosure of the third embodiment has a substantially smaller volume of working liquid and has substantially less shielding. The operation of the third embodiment of the radon removal apparatus is similar to the operation of the second embodiment.

We claim:

1. An apparatus for removing radon from a gas in a confined space, the apparatus comprising:

(a) a liquid-gas contacting enclosure containing a hydrocarbon oil working liquid in which radon is soluble, the working liquid remaining within the enclosure and having no communication with any enclosure that treats the working liquid, the enclosure having an inlet communicating with the confined space, an outlet communicating with the confined space, and walls shielded with a material selected from lead, concrete, brick, sand, water, or soil; and (b) a means for causing a stream of gas containing radon from the confined space to pass through the inlet and through the working liquid in the enclosure to treat the gas by removing at least a portion of the radon from the gas and then to return the treated gas to the confined space through the outlet.

2. The apparatus of claim 1 wherein the enclosure comprises a perforated pipe or plate through which the radon containing gas flows and wherein the perforated pipe or plate is submerged in the working liquid.

3. A structure comprising:

(a) a confined space filled with a gas containing radon;

(b) a liquid-gas contacting enclosure containing a hydrocarbon oil working liquid in which radon is soluble, the working liquid remaining within the enclosure and having no communication with any enclosure that treats the working liquid, the enclosure having an inlet communicating with the confined space, an outlet communicating with the confined space, and walls shielded with a material selected from lead, concrete, brick, sand, water, or soil; and (c) a means for causing a stream of gas from the confined space to pass through the inlet and through the working liquid in the enclosure to treat the gas by removing at least a portion of the radon from the gas and then to return the treated gas to the confined space through the outlet.

4. The structure of claim 3 wherein the enclosure comprises a perforated pipe or plate through which the radon containing gas flows and wherein the perforated pipe or plate is submerged in the working liquid.

\* \* \* \* \*